US006845851B1

(12) United States Patent
Donaldson et al.

(10) Patent No.: US 6,845,851 B1
(45) Date of Patent: Jan. 25, 2005

(54) BRAKING CONTROL SYSTEM FOR A VEHICLE BEING TOWED BY ANOTHER VEHICLE

(75) Inventors: Robert A. Donaldson, Apache Junction, AZ (US); Surgit Gill, Prescott Valley, AZ (US); Kyle Stanton, Glendale, AZ (US)

(73) Assignee: Automatic Equipment Manufacturing Co., Pender, NE (US)

( * ) Notice: Subject to any disclaimer, the term of this patent is extended or adjusted under 35 U.S.C. 154(b) by 0 days.

(21) Appl. No.: 10/761,677

(22) Filed: Jan. 21, 2004

(51) Int. Cl.$^7$ .............................. B60T 13/00; B60T 7/20
(52) U.S. Cl. .......................................... 188/3 H; 303/7
(58) Field of Search ................................ 188/3 H, 3 R, 188/112 A, 112 R; 303/3, 7, 20

(56) References Cited

U.S. PATENT DOCUMENTS

| | | | |
|---|---|---|---|
| 1,907,835 A | | 5/1933 | Langbein |
| 2,566,859 A | | 9/1951 | Seeler |
| 2,676,225 A | | 4/1954 | Jubell |
| 2,711,228 A | | 6/1955 | Shank |
| 2,964,965 A | | 12/1960 | Hanson |
| 3,662,593 A | | 5/1972 | Pirrello et al. |
| 3,877,318 A | | 4/1975 | Castoe |
| 3,991,609 A | | 11/1976 | Asmus et al. |
| 4,186,595 A | | 2/1980 | Domitter |
| 5,012,689 A | | 5/1991 | Smith |
| 5,299,668 A | | 4/1994 | Youngers et al. |
| 5,411,321 A | * | 5/1995 | Harness ........................... 303/7 |
| 5,431,253 A | * | 7/1995 | Hargrove .................... 188/3 H |
| 5,588,716 A | * | 12/1996 | Stumpe .......................... 303/7 |
| 5,722,736 A | * | 3/1998 | Cook ........................... 303/15 |
| 6,126,246 A | * | 10/2000 | Decker, Sr. et al. ............. 303/7 |
| 6,609,766 B1 | * | 8/2003 | Chesnut ......................... 303/7 |
| 6,644,761 B2 | * | 11/2003 | Schuck ....................... 303/123 |
| 6,666,527 B2 | * | 12/2003 | Gill et al. ....................... 303/7 |
| 6,685,281 B2 | * | 2/2004 | MacGregor et al. ........ 303/123 |
| 2003/0168908 A1 | * | 9/2003 | Robinson et al. .............. 303/7 |

* cited by examiner

Primary Examiner—Chris Schwartz
(74) Attorney, Agent, or Firm—Donald R. Schoonover

(57) ABSTRACT

A system for controlling the braking system of a towed vehicle being towed by a towing vehicle having a towing vehicle subsystem for the towing vehicle and a towed vehicle subsystem for the towed vehicle. The towing vehicle subsystem includes a towing vehicle control mechanism having a brakes-on indicator and a towing vehicle receiver mechanism for receiving wireless modulated digital signals. The towed vehicle subsystem for a towed vehicle includes a towed vehicle control mechanism, a linkage mechanism connecting the towed vehicle control mechanism to the braking system of the towed vehicle, a sensing mechanism for sensing activation of the braking system of the towed vehicle, and a towed vehicle transmitter mechanism for transmitting wireless modulated digital signals to the towing vehicle transmitter mechanism, wherein actuation of the towing vehicle control mechanism by an operator of the towing vehicle actuates the towed vehicle control mechanism causing the linkage mechanism to actuate the braking system of the towed vehicle and wherein the sensing mechanism, upon sensing actuation of the braking system of the towed vehicle, causes the towed vehicle transmitter mechanism to wirelessly transmit modulated digital signals to the towing vehicle receiver mechanism which, in conjunction with the towing vehicle control mechanism, causes the display device to indicate that the braking system of the towed vehicle has been actuated. A modified embodiment further includes a towing vehicle transmitter mechanism and a towed vehicle receiver mechanism for wirelessly actuating the braking system of the towed vehicle without actuating the braking system of the towing vehicle.

14 Claims, 2 Drawing Sheets

BRAKING CONTROL SYSTEM FOR A VEHICLE BEING TOWED BY ANOTHER VEHICLE

BACKGROUND OF THE INVENTION

1. Field of the Invention

The present invention is related to land vehicles and, more specifically without limitation, to braking systems of land vehicles.

2. Discussion of the Related Art

Towing a vehicle behind another vehicle is not uncommon. However, such an arrangement can be hazardous, sometimes resulting in disastrous consequences. For example, in an arrangement wherein the braking system of a trailing or towed vehicle cannot be directly applied by the operator of a leading or towing vehicle, braking and stopping of a tandem towing vehicle/towed vehicle arrangement may be totally dependent on only the brakes of the towing vehicle. In some cases, the brakes of the towing vehicle may be sufficient for the towing vehicle but insufficient for the towing vehicle in combination with the towed vehicle, especially in an emergency where dependency on the brakes of the towing vehicle may be critical. For example, if a tandem towing vehicle/towed vehicle arrangement must be rapidly stopped by applying only the brakes of the towing vehicle, the towed vehicle may jack-knife probably causing substantial property damage and even bodily injury.

Devices are available for situations wherein the towed vehicle is a trailer and deceleration of the towing vehicle causes such devices to apply the brakes of the trailer to assist with slowing or braking the towing vehicle/trailer combination. Unfortunately, such devices are not readily adaptable for arrangements where a four-wheeled motor vehicle, such as an automobile, is being towed by another four-wheeled motor vehicle.

Further, situations may arise when a towed vehicle is being towed by a towing vehicle wherein it may be desirable to apply only the brakes of the towed vehicle to simultaneously apply braking action to both the towing vehicle and the towed vehicle without applying the brakes of the towing vehicle such as when the brakes of the towing vehicle have become or are becoming overheated; the brakes of the towing vehicle have become sufficiently worn whereby the brakes have become unreliable but must continue to be used until they can be repaired; or when the towed vehicle is not properly following the towing vehicle and a minor, momentary braking action of only the towed vehicle but not the towing vehicle would correct the condition; etc.

What is needed is a braking control system for a vehicle being towed by another vehicle wherein the operator of the towing vehicle can be reliable informed when the brakes of the towed vehicle are being applied. What is also needed is a braking control system for a vehicle being towed by another vehicle wherein the operator of the towing vehicle can apply the brakes of the towed vehicle without applying the brakes of the towing vehicle.

SUMMARY OF THE INVENTION

The present invention includes a improved system for controlling the braking system of a towed vehicle being towed by a towing vehicle comprises a towing vehicle subsystem for a towing vehicle that includes a towing vehicle control mechanism that has a monitoring mechanism with a display device with a brakes-on indicator, and a towing vehicle receiver mechanism that has first circuitry connected in communication with the towing vehicle control mechanism wherein the towing vehicle receiver mechanism is structured and configured to operatively and wirelessly receive modulated digital signals. The improved system of the present invention also includes a towed vehicle subsystem for a towed vehicle that has a towed vehicle control mechanism, communication means connecting the towed vehicle subsystem in communication with the towing vehicle subsystem, a linkage mechanism connecting the towed vehicle control mechanism to the braking system of the towed vehicle, a sensing mechanism connected in communication with the towed vehicle control mechanism wherein the sensing mechanism includes a braking sensor structured and configured to operatively sense activation of the braking system of the towed vehicle, and a towed vehicle transmitter mechanism connected to the towed vehicle control mechanism that includes second circuitry structured and configured to operatively and wirelessly transmit modulated digital signals to the towing vehicle transmitter mechanism. The improved system of the present invention also includes at least one power source providing electrical power to the towing vehicle subsystem and the towed vehicle subsystem. The improved system of the present invention is structured and configured such that actuation of the towing vehicle control mechanism by an operator of the towing vehicle actuates the towed vehicle control mechanism, causing the linkage mechanism to actuate the braking system of the towed vehicle, whereupon the sensing mechanism, upon sensing actuation of the braking system of the towed vehicle, causes the towed vehicle transmitter mechanism to wirelessly transmit modulated digital signals to the towing vehicle receiver mechanism which, in conjunction with the towing vehicle control mechanism, causes the display device to indicate that the braking system of the towed vehicle has been actuated.

The improved system of the present invention further includes the sensing mechanism having an accelerometer that provides deceleration signals to the towed vehicle control mechanism wherein the deceleration signals reflect the magnitude of deceleration being experienced by the towed vehicle, and the towed vehicle control mechanism being structured and configured to compare the magnitude of the deceleration signals provided by the accelerometer with the magnitude of a selected one of a plurality of magnitudes of deceleration, wherein the towed vehicle control mechanism actuates the linkage mechanism if the magnitude of the deceleration signals provided by the accelerometer exceeds the magnitude of the selected one of a plurality of magnitudes of deceleration.

The linkage mechanism includes two electronically actuated pneumatic valves that are actuatable by the towed vehicle control mechanism in response to deceleration signals provided by the accelerometer that exceed the magnitude of the selected one of the plurality of magnitudes of deceleration. The two electronically actuated pneumatic valves are automatically deactuated as the magnitude of deceleration, as reflected by the deceleration signals provided by the accelerometer, operatively falls below the magnitude of the selected one of the plurality of magnitudes of deceleration.

The towed vehicle subsystem includes a towed vehicle multi-position DIP switch wherein the towed vehicle DIP switch is structured and configured to provide encoding to the modulated digital signals transmitted by the towed vehicle transmitter mechanism. In addition, the towing vehicle subsystem includes a towing vehicle multi-position DIP switch wherein the towing vehicle DIP switch is structured and configured to decode the modulated digital signals received by the towing vehicle receiver mechanism from the towed vehicle transmitter mechanism. The towed vehicle receiver mechanism demodulates the modulated digital signals received from the towed vehicle transmitter mechanism and produces an output that is analyzed by a decoder portion thereof to determine whether the settings of the switches of the towed vehicle DIP switch, as encoded in the modulated digital signals wirelessly received by the towing vehicle receiver mechanism from the towed vehicle transmitter mechanism, match the settings of the switches of the towing vehicle DIP switch. The towing vehicle control mechanism actuates the brakes-on indicator if the towing vehicle control system determines that the settings of the switches of the towed vehicle DIP switch match the settings of the switches of the towing vehicle DIP switch.

A modified embodiment of the braking control system of the present invention further includes a towing vehicle transmitter mechanism having third circuitry connected in communication with the towing vehicle control mechanism wherein the towing vehicle transmitter mechanism is structured and configured to operatively and wirelessly transmit towing vehicle modulated digital signals, and a towed vehicle receiver mechanism having fourth circuitry connected in communication with the towed vehicle control mechanism wherein the towed vehicle receiver mechanism is structured and configured to operatively and wirelessly receive the towing modulated digital signals transmitted by the towing vehicle transmitter mechanism such that the operator of the towing vehicle can wirelessly actuate the braking system of the towed vehicle without actuating the braking system of the towing vehicle.

PRINCIPAL OBJECTS AND ADVANTAGES OF THE INVENTION

The principal objects and advantages of the present invention include: providing a braking control system for a towed vehicle being towed by a towing vehicle; providing such a braking control system for a towed vehicle being towed by another vehicle wherein the operator of the towing vehicle is reliable informed when the brakes of the towed vehicle are being applied; providing such a braking control system for a vehicle being towed by another vehicle wherein the operator of the towing vehicle can apply the brakes of the towed vehicle without applying the brakes of the towing vehicle; providing such a braking control system for a vehicle being towed by another vehicle wherein the operator of the towing vehicle can wirelessly apply the brakes of the towed vehicle without applying the brakes of the towing vehicle; and generally providing such a braking control system for a vehicle being towed by another vehicle that is reliable in performance, capable of long lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The braking control system of the present invention is designed to be used in conjunction with the braking system of a towed vehicle being towed by a towing vehicle. The inventive system consists of two major components: a transmitter and a receiver. The transmitter is positioned in the towed or trailing vehicle, while the receiver is positioned in the towing or leading vehicle such that the transmitter will appropriately indicate to the operator of the towing vehicle when the brakes of the towed vehicle are being applied by illuminating an indicator light that is visible to the operator of the towing vehicle.

Figure 1:
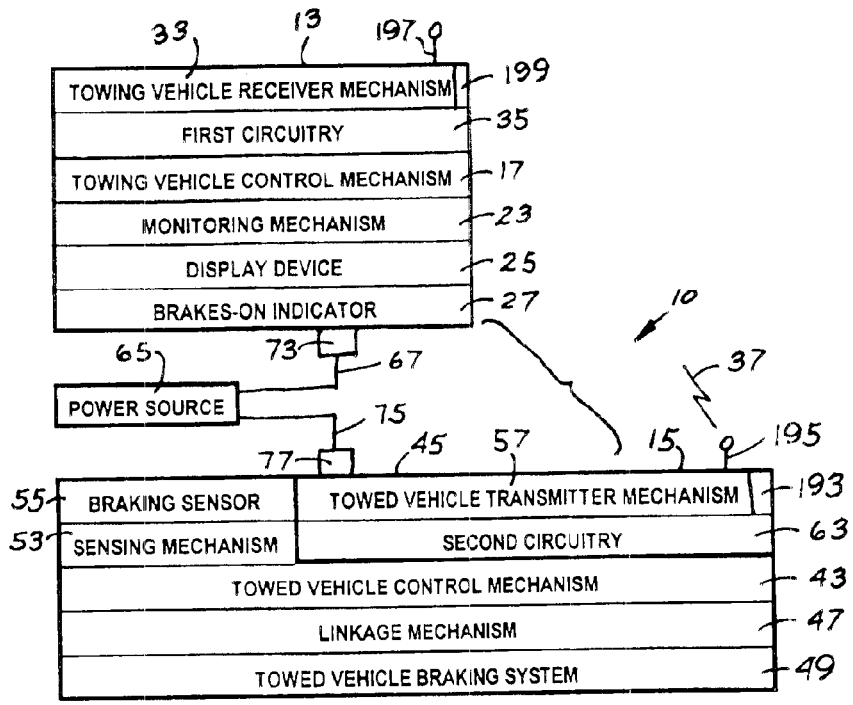
FIG. 1 is a schematic representation of a braking control system for a vehicle being towed by another vehicle, according to the present invention.
Figure 2:
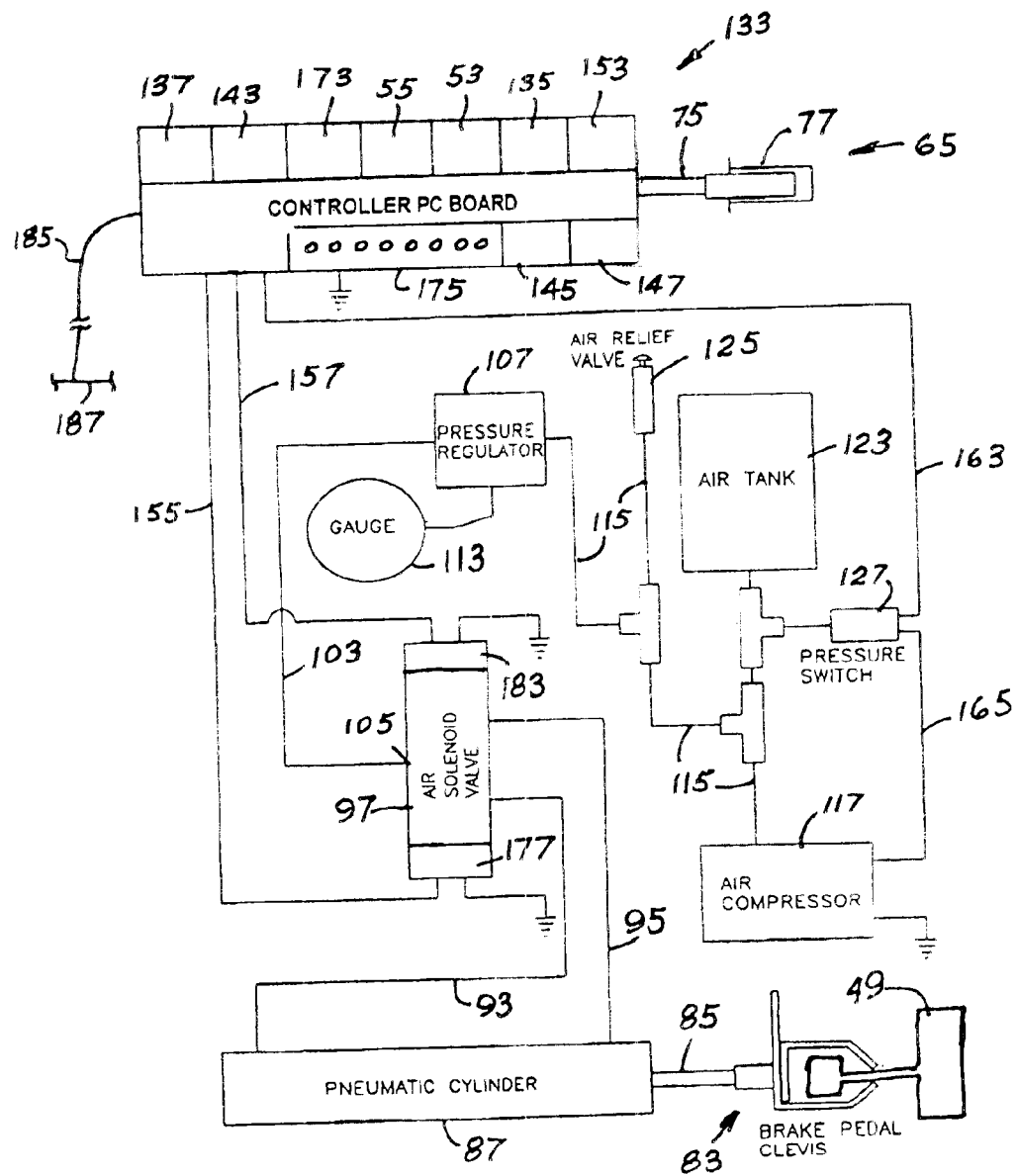
FIG. 2 is a schematic representation of various components of the braking control system for a vehicle being towed by another vehicle, including a linkage mechanism thereof.

The reference numeral 10 refers generally to a braking control system for a vehicle being towed by another vehicle, as depicted in FIGS. 1 and 2. The towed vehicle braking control system 10 of the present invention includes a towing vehicle subsystem 13 positioned in the towing vehicle (not shown) and a towed vehicle subsystem 15 positioned in the towed vehicle being towed by the towing vehicle (not shown).

The towing vehicle subsystem 13 comprises a towing vehicle control mechanism 17 that includes a monitoring mechanism 23 with a display device 25 having a brakes-on indicator 27 that indicates to the driver of the towing vehicle that the brakes of the towed vehicle are being applied. The towing vehicle subsystem 13 also comprises a towing vehicle receiver mechanism 33 that includes first circuitry 35 that connects the towing vehicle receiver mechanism 33 in communication with the towing vehicle control mechanism 17, wherein the towing vehicle receiver mechanism 33 is structured and configured to operatively and wirelessly receive encoded digital signals 37.

The towed vehicle subsystem 15 comprises a towed vehicle control mechanism 43, communication means 45 that connects the towed vehicle subsystem 15 in communication with the towing vehicle subsystem 13; a linkage mechanism 47 that connects the towed vehicle control mechanism 43 to the braking system 49 of the towed vehicle; and sensing mechanism 53 connected in communication with the towed vehicle control mechanism 43 wherein the sensing means 53 includes a braking sensor 55 structured and configured to operatively sense activation of the braking system 49 of the towed vehicle. The communication means 45 includes a towed vehicle transmitter mechanism 57 including second circuitry 63 that connects the towed vehicle transmitter mechanism 57 in communication with the towed vehicle control mechanism 37 wherein the towed vehicle transmitter mechanism 57 is structured and configured to operatively and wirelessly transmit encoded digital signals 37 to the towing vehicle receiver mechanism 33.

The towed vehicle braking control system 10 of the present invention also comprises at least one power source 65 structured and configured to operatively supply electrical power to the towing vehicle subsystem 13 and to the towed vehicle subsystem 15. For example, electrical power may be provided to the towing vehicle subsystem 13 and the towed vehicle subsystem 15 via a connection to the vehicle battery of the towing vehicle, including an electrical connection in the harness interconnecting the towing vehicle and the towed vehicle for towing purposes to thereby provide electrical power from the vehicle battery of the towing vehicle to the towed vehicle subsystem 15. Preferably, electrical power for the towed vehicle subsystem 15 is provided by a connector 75 that connects the towed vehicle subsystem 15 to a cigarette lighter socket 77 of the towed vehicle, while electrical power for the towing vehicle subsystem 13 is similarly provided by a connector that connects the towing vehicle subsystem 13 to a cigarette lighter socket of the towing vehicle. Alternatively, it is to be understood that the towed vehicle subsystem 15 and/or the towing vehicle subsystem 13 may include separate self-contained power sources, such as batteries for example. In other words and for convenience purposes, the braking control system 10 of the present invention is structured and configured to operate on a twelve-volt power source that is generally available in all motor vehicles. The twelve-volt input is then regulated down as necessary for the various components of the brake control system 10.

The towing vehicle subsystem 13 and the towed vehicle subsystem 15 are structured and configured wherein actuation of the towing vehicle control mechanism 17 by an operator of the towing vehicle actuates the towed vehicle control mechanism 43 causing the linkage mechanism 47 to actuate the braking system 49 of the towed vehicle and wherein the sensing mechanism 53, upon sensing actuation of the braking system 49 of the towed vehicle, causes the towed vehicle transmitter mechanism 57 to wirelessly, transmit modulated digital signals 37 to the towing vehicle receiver mechanism 33 which, in conjunction with the towing vehicle control mechanism 17, causes the display device 25 to indicate that the braking system 49 of the towed vehicle has been actuated.

The linkage mechanism 47 includes a brake connector 83, such as a clevis 83 for connecting to the brake pedal 51 of the towed vehicle, or other suitable arrangement for connecting the braking control system 10 to the braking system 49 of the towed vehicle. The brake connector 83 is mounted on an extendable ram 85 of a double-acting pneumatic cylinder 87. A pair of conduits 93, 95 separately connect opposing end chambers of the double-acting pneumatic cylinder 87 in fluid communication with a solenoid-controlled double pneumatic valve 97. A conduit 103 connects an input 105 of the double-acting pneumatic cylinder 87 in fluid communication with a pressure regulator 107. A pressure gauge 113 monitors the pressure at the pressure regulator 107.

Pressurized air is provided to the pressure regulator 107 through conduit arrangement 115 by an electrically powered compressor 117. An air tank 123, in fluid communication with the pressure regulator 107 and with the air compressor 117 via the conduit arrangement 115, provides a ballast for the linkage mechanism 47. An air relief valve 125 having a preset release value acts as a safety mechanism to prevent over-pressurization of the linkage mechanism 47. A pressure switch 127 in fluid communication with the conduit arrangement 115 is preset to determine a condition whereat the pressure in the conduit arrangement 115 falls below a predetermined value, whereupon the pressure switch 127 causes electrical power to be connected to the air compressor 117 to thereby reestablish and replenish a desired magnitude of air pressure in the conduit arrangement 115 and in the ballast tank 123, after which the pressure switch 127 terminates electrical power to the air compressor 117.

The towed vehicle control mechanism 43 has a controller board 133 that includes a micro-controller 135 that comprises the decision-making circuitry thereof; a pair of transistors 137, 143; a sensitivity button 145; a test button 147; and a break-away connector 153. Electrical power is provided to the controller board 133 by a connection to the power source 65. The electrical power provided to the controller board 133 is, in turn, connected to the solenoid valve 97 via conductors 155, 157 and to the air compressor 117 through the pressure switch 127 via conductors 163, 165.

The braking sensor 55 of the sensing mechanism 53 includes an accelerometer 173 that is structured and configured to operatively output a pulse width-modulated signal according to the magnitude of deceleration being experienced by the accelerometer 173. The micro-controller 135 receives inputs from the accelerometer 173, the sensitivity button 145, the test button 147, and the break-away connector 153 and, in turn, sends outputs to the two transistors 137, 143 and to a plurality of sensitivity lights 175 as described herein.

The controller board 133 is structured and configured to trigger solenoid-valves 177, 183 of the electronically actuated double pneumatic valve 97. The braking control system 10 has a plurality of sensitivity levels, one corresponding to each of the plurality of sensitivity lights 175. The controller board 133 actuates the double valve 97 based on the magnitude of deceleration sensed by the accelerometer 173 as established by a selected level of sensitivity for activation of the braking control system 10. In an application wherein the braking control system 10 has eight sensitivity levels, the desired sensitivity level is selected by repeatedly pressing the sensitivity button 145 the number of times corresponding to the desired deceleration sensitivity level, for example, pressing the sensitivity button 145 six times to preset the system 10 to the sensitivity level that corresponds to the sixth sensitivity level of the plurality of sensitivity levels with a corresponding one of the plurality of sensitivity lights 175 being illuminated to display the level of sensitivity selected to cause the towed vehicle control mechanism 43 to actuate the braking system 49 of the towed vehicle, sometimes referred to herein an the selected deceleration threshold.

During deceleration (braking) by actuating the braking system of the towing vehicle, the controller board 133 compares the magnitude of deceleration force, as detected by the accelerometer 173, with the selected deceleration threshold as established by the selected sensitivity level of the plurality of sensitivity levels. When the controller board 133 determines that the magnitude of deceleration force is greater than the magnitude of the selected deceleration threshold, the double valve 97 is actuated to appropriately direct air flow to the pneumatic cylinder 87 to thereby apply the braking system 49 of the towed vehicle. Once the towed vehicle has slowed down such that the magnitude of deceleration, as detected by the accelerometer 173, has fallen below the magnitude of the selected deceleration threshold, the controller board 133 actuates the double valve 97 in a manner that bleeds off the air pressure that is forcing the ram 85 to actuate the braking system 49 of the towed vehicle, thereby deactivating the braking action of the braking system 49 of the towed vehicle.

The towed vehicle transmitter mechanism 57 has two modes of operation: transmit and standby. A conductor 185 connects the brake signal light conductor 187 of the towed vehicle (generally located under the dash of the towed vehicle) to the towed vehicle transmitter mechanism 57. When the brake signal light conductor 187 of the towed vehicle is not carrying a signal indicating that the braking system 49 of the towed vehicle has been actuated, the towed vehicle transmitter mechanism 57 remains in standby mode. When the brake signal light conductor 187 of the towed vehicle is carrying a signal indicating that the braking system 49 of the towed vehicle has been actuated, the transmit mode of the towed vehicle transmitter mechanism 57 is enabled. It is to be understood that some applications may not require the use of the conductor 185 that connects the brake signal light conductor 187 of the towed vehicle to the towed vehicle transmitter mechanism 57. In that event, the towed vehicle transmitter mechanism 57 is set to remain in the transmit mode.

When the towed vehicle transmitter mechanism 57 begins to transmit, an encoder portion inside the towed vehicle transmitter mechanism 57 generates a code having an active data bit portion, that corresponds to whether the brake signal light conductor 187 of the towed vehicle is carrying a signal indicating that the braking system 49 of the towed vehicle has been actuated, and a preset address portion. The address portion of the code is generated by setting a selected combination of switches on a multi-position DIP switch 193 in an encoder portion of the towed vehicle transmitter mechanism 57. The code generated by the encoder portion is then frequency modulated with a carrier signal and the resulting signal 37 wirelessly transmitted by the towed vehicle transmitter mechanism 57 via antenna 195, such as at 916 MHz FM, for example.

The towing vehicle receiver mechanism 33 receives the signal 37 via antenna 197, and demodulates the signal 37 to produce an output that is analyzed by a decoder portion of the towing vehicle receiver mechanism 33. The decoder portion analyzes the signal 37 to determine whether the address portion of the signal 37 matches the address provided to the decoder portion of the towing vehicle receiver mechanism 33 by a towing vehicle multi-position DIP switch 199. If the decoder portion determines that the address portion of the signal 37 does match the address provided by the towing vehicle DIP switch 199, the decoder portion then decodes the active data bit portion of the signal to determine whether the data bit portion indicates that the brake signal light conductor 187 is carrying a signal that indicates that a brake light of the towed vehicle has been actuated. If the data bit portion determines that the brake signal light conductor 187 is carrying a signal that indicates that a brake light of the towed vehicle has been actuated, the decoder portion then signals the brakes-on indicator 27 via the towing vehicle control system 13, causing the brakes-on indicator 27 to be illuminated. If the data bit portion is determined to indicate that the brake signal light conductor is no longer carrying a signal indicating that a brake light of the towed vehicle is being actuated, the decoder portion signals the towing vehicle control system 13 to turn off the brakes-on indicator 27. The address established by the settings of the switches of the towing vehicle DIP switch 199 must identically match the address established by the settings of the switches of the towed vehicle DIP switch 193. Otherwise, the towed vehicle subsystem 15 will be unable to notify the operator of the towing vehicle via the towing vehicle subsystem 13 that the braking system 49 of the towed vehicle have been actuated.

The actual details of the circuitry, interconnections, and any embedded software for enabling the various components of the braking system of the present invention as disclosed herein are known and/or readily available to persons having ordinary skill in the relevant art and will not be discussed herein in detail.

In an application of the present invention, an enclosure containing the towed vehicle subsystem 15 is appropriately lodged or otherwise fixedly positioned in a towed vehicle such that the linkage mechanism 47 can efficiently and reliably actuate the braking system 49 of the towed vehicle as hereinbefore described. For proper performance, the accelerometer 173 must be properly oriented relative to the towed vehicle, such as in a horizontal plane parallel to the ground and to a fore-and-aft axis of the towed vehicle or other suitable orientation: Another enclosure containing the towing vehicle subsystem 13 is appropriately positioned in a towing vehicle that will be towing the towed vehicle such that display device 25 and brakes-on indicator 27 is viewable by the operator of the towing vehicle as hereinbefore described. When the operator of the towing vehicle actuates the brakes of the towing vehicle to apply braking action to the towing vehicle and the towed vehicle, the digital accelerometer 173 provides a pulse width-modulated signal to the micro-controller 135 that corresponds to the braking action. When the micro-controller 135 receives the signal from the accelerometer 173, the micro-controller 135 compares that signal with the selected deceleration threshold. If the micro-controller 135 determines that the signal from the accelerometer 173 indicates a magnitude of deceleration that is greater than the selected deceleration threshold, the micro-controller 135 drives two transistors 137, 143 which, in turn, amplify the signal and drive the solenoid-actuated valves 177, 183 to thereby cause the pneumatic cylinder 87 to extend the ram 85 and apply the braking system 49 of the towed vehicle. In addition, the towed vehicle transmitter mechanism 57 wirelessly transmits an encoded signal 37 to the towing vehicle receiver mechanism 33 which, by way of the towing vehicle control mechanism 17, causes the brakes-on indicator 27 of the display device 25 to be illuminated. Subsequently, when the micro-controller 135 determines that the signal from the accelerometer 173 indicates a magnitude of deceleration that is of lesser magnitude than the selected deceleration threshold thereby indicating that the magnitude of deceleration, caused by the operator of the towing vehicle applying the brakes of the towing vehicle, has fallen below the selected deceleration threshold, the micro-controller 135 drive the transistors 137, 143 which, in turn, drive the solenoid-actuated valves 177, 183 to thereby cause the pneumatic cylinder 87 to retract the ram 85 and terminate application of the braking system 49 of the towed vehicle.

Figure 3:
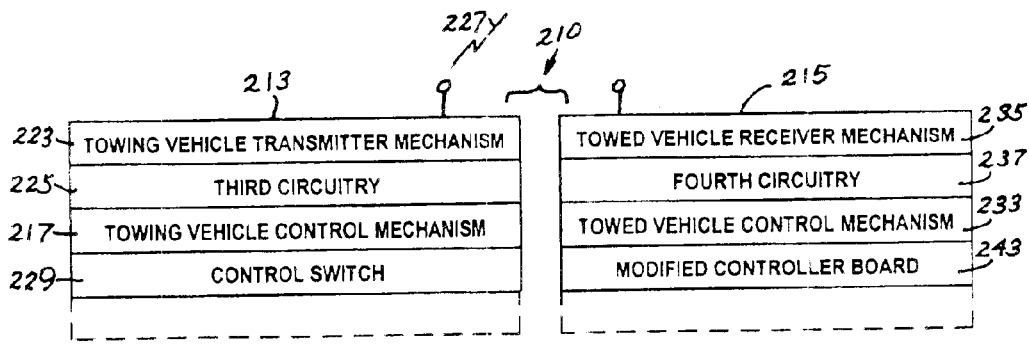
FIG. 3 is a schematic representation of portions of a modified embodiment of the braking control system for a vehicle being towed by another vehicle, according to the present invention.

A modified embodiment of the braking control system, generally referred to herein by reference numeral 210, is depicted in FIG. 3. Modified embodiment 210 includes the components of embodiment 10 of the braking control system of the present invention, which components are substantially similar to those hereinbefore described and, therefore, such descriptions will not be reiterated in detail.

Modified embodiment 210 of the present invention includes a towing vehicle subsystem 213 positioned in a towing vehicle and a towed vehicle subsystem 215 positioned in a towed vehicle being towed by the towing vehicle. In addition to the components of the towing vehicle subsystem 13 of embodiment 10, the towing vehicle subsystem 213 of modified embodiment 210 includes a towing vehicle control mechanism 217 and a towing vehicle transmitter mechanism 223 with third circuitry 225 connecting the towing vehicle transmitter mechanism 223 in communication with the towing vehicle control mechanism 217, wherein the towing vehicle transmitter mechanism 223 is structured and configured to operatively and wirelessly transmit second encoded digital signals 227 by the operator of the towing vehicle activating a control switch 229, wherein the control switch 229 includes a push button or lever that automatically returns to an unactuated position when released and/or a toggle switch that is manually returned to an unactuated position. In addition to the components of the towed vehicle subsystem 15 of embodiment 10, the towed vehicle subsystem 215 of modified embodiment 210 includes a towed vehicle control mechanism 233 and a towed vehicle receiver mechanism 235 with fourth circuitry 237 connecting the towing vehicle receiver mechanism 235 in communication with the towing vehicle control mechanism 233, wherein the towing vehicle receiver mechanism 235 is structured and configured to operatively and wirelessly receive the second encoded digital signals 227.

The modified braking control system 210 of the present invention is structured and configured such that activation of the towing vehicle transmitter mechanism 223 of the towing vehicle control mechanism 217 by the operator of the towing vehicle wirelessly transmits second encoded digital signals 227 to the towed vehicle receiver mechanism 235 of the towed vehicle receiver mechanism 233 which, by replacing or otherwise overriding the signal normally originated by the accelerometer 173 as hereinbefore described, causes a modified controller board 243 to actuate the linkage mechanism 47 to thereby actuate the braking system 49 of the towed vehicle, as hereinbefore described. Also as hereinbefore described, the sensing mechanism 53, upon sensing the activation of the braking system 49 of the towed vehicle, causes the towed vehicle transmitter mechanism 57 to wirelessly transmit first encoded digital signals 37 to the towing vehicle receiver mechanism 33 which, in conjunction with the towing vehicle control mechanism 217, causes the display device 25 to indicate that the braking system 49 of the towed vehicle has been actuated, all as hereinbefore described.

In an application of the modified braking control system 210 of the present invention, the user can, if desired, apply only the braking system 49 of the towed vehicle to simultaneously apply braking action to both the towing vehicle and the towed vehicle without applying the braking system of the towing vehicle. Events for which such an arrangement might be desirable include (I) a condition wherein brakes of the towing vehicle have become overheated; (2) a condition wherein brakes of the towing vehicle have become sufficiently worn such they have become unreliable; (3) a condition where the towed vehicle is not properly following the towing vehicle and a minor, momentary braking action by only the braking system 49 of the towed vehicle would correct the condition; etc. For applications utilizing the modified embodiment 210, it may be desirable to set the sensitivity level at a lower selected deceleration threshold than might be used for a similar towing vehicle/towed vehicle arrangement using braking control system 10. Subsequently, when the condition causing the need for the operator of the towing vehicle to use the towing vehicle transmitter mechanism 223 of the modified embodiment 210 by manually activating the braking system 49 of the towed vehicle has been removed, the control switch 229—be it push button switch or toggle switch, whichever the case may be—is allowed or caused to return to its unactuated position.

It is to be understood that while certain forms of the present invention have been illustrated and described herein, it is not to be limited to the specific forms or arrangement of parts described and shown.

What is claimed and desired to be secured by Letters Patent is as follows:

1. A system for controlling the braking system of a towed vehicle being towed by a towing vehicle, the system comprising:
  (a) a towing vehicle subsystem for a towing vehicle, including:
    (1) a towing vehicle control mechanism including a monitoring mechanism with a display device having a brakes-on indicator,
    (2) a towing vehicle receiver mechanism that includes first circuitry connected in communication with the towing vehicle control mechanism wherein the towing vehicle receiver mechanism is structured and configured to operatively and wirelessly receive modulated digital signals, and
    (3) a towed vehicle multi-position DIP switch, wherein the towed vehicle DIP switch is structured and configured to provide encoding to the modulated digital signals transmitted by the towed vehicle transmitter mechanism;
  (b) a towed vehicle subsystem for a towed vehicle, including:
    (1) a towed vehicle control mechanism,
    (2) communication means connecting the towed vehicle subsystem in communication with the towing vehicle subsystem,
    (3) a linkage mechanism connecting the towed vehicle control mechanism to the braking system of the towed vehicle,
    (4) a sensing mechanism connected in communication with the towed vehicle control mechanism wherein the sensing mechanism includes a braking sensor structured and configured to operatively sense activation of the braking system of the towed vehicle,
    (5) a towed vehicle transmitter mechanism connected to the towed vehicle control mechanism that includes second circuitry structured and configured to operatively and wirelessly transmit modulated digital signals to the towing vehicle transmitter mechanism, and
    (6) a towing vehicle multi-position DIP switch, wherein the towing vehicle DIP switch is structured and configured to decode the modulated digital signals received by the towing vehicle receiver mechanism from the towed vehicle transmitter mechanism; and
  (c) at least one power source providing electrical power to the towing vehicle subsystem and the towed vehicle subsystem; and
  (d) wherein actuation of the towing vehicle control mechanism by an operator of the towing vehicle actuates the towed vehicle control mechanism causing the linkage mechanism to actuate the braking system of the towed vehicle and wherein the sensing mechanism, upon sensing actuation of the braking system of the towed vehicle, causes the towed vehicle transmitter mechanism to wirelessly transmit modulated digital signals to the towing vehicle receiver mechanism which, in conjunction with the towing vehicle control mechanism, causes the display device to indicate that the braking system of the towed vehicle has been actuated.

2. The towed vehicle braking control system as described in claim 1, further including:
  (a) the sensing mechanism having an accelerometer that provides deceleration signals to the towed vehicle control mechanism, wherein the deceleration signals reflect the magnitude of deceleration being experienced by the towed vehicle; and (b) the towed vehicle control mechanism is structured and configured to compare the magnitude of the deceleration signals provided by the accelerometer with the magnitude of a selected one of a plurality of magnitudes of deceleration; and (c) wherein the towed vehicle control mechanism actuates the linkage mechanism if the magnitude of the deceleration signals provided by the accelerometer exceeds the magnitude of the selected one of a plurality of magnitudes of deceleration.

3. The towed vehicle braking control system as described in claim 2, wherein the plurality of magnitudes of deceleration includes at least eight different magnitudes of deceleration.

4. The towed vehicle braking control system as described in claim 3, wherein the linkage mechanism includes two electronically actuated pneumatic valves, that are actuatable by the towed vehicle control mechanism in response to deceleration signals provided by the accelerometer that exceed the magnitude of the selected one of the plurality of magnitudes of deceleration, and the two electronically actuated pneumatic valves are automatically deactuated as the magnitude of deceleration as reflected by the deceleration signals provided by the accelerometer operatively falls below the magnitude of the selected one of the plurality of magnitudes of deceleration.

5. The towed vehicle braking control system as described in claim 2, wherein the linkage mechanism includes two electronically actuated pneumatic valves that are actuated by the towed vehicle control mechanism when the magnitude of deceleration as provided by the accelerometer exceeds the selected level of magnitude of deceleration.

6. The towed vehicle braking control system as described in claim 1, wherein the towing vehicle receiver mechanism demodulates the modulated digital signals received from the towed vehicle transmitter mechanism and produces an output that is analyzed by a decoder portion thereof to determine whether the settings of the switches of the towed vehicle DIP switch, as encoded in the modulated digital signals wirelessly received by the towing vehicle receiver mechanism from the towed vehicle transmitter mechanism, match the settings of the switches of the towing vehicle DIP switch.

7. The towed vehicle braking control system as described in claim 6, wherein the towing vehicle control mechanism actuates the brakes-on indicator if the towing vehicle control system determines that the settings of the switches of the towed vehicle DIP switch match the settings of the switches of the towing vehicle DIP switch.

8. The towed vehicle braking control system as described in claim 1, wherein the braking sensor cooperatively includes the brake signal light conductor of the towed vehicle.

9. The towed vehicle braking control system as described in claim 1, wherein the towed vehicle transmitter mechanism has a transmit mode and a standby mode.

10. The towed vehicle braking control system as described in claim 1, wherein the digital signals are frequency modulated by the towed vehicle transmitter mechanism.

11. The towed vehicle braking control system as described in claim 1, wherein the digital signals are frequency modulated with a carrier signal having a frequency of 916 MHz.

12. The towed vehicle braking control system as described in claim 1, wherein the power source includes a connector for connecting the towed vehicle subsystem and/or the towing vehicle subsystem to a cigarette lighter socket of the respective towed or towing vehicle.

13. The towed vehicle braking control system as described in claim 1, wherein the communication means includes:

(a) a towing vehicle transmitter mechanism having third circuitry connected in communication with the towing vehicle control mechanism, wherein the towing vehicle transmitter mechanism is structured and configured to operatively and wirelessly transmit second modulated digital signals; and (b) a towed vehicle receiver mechanism having fourth circuitry connected in communication with the towed vehicle control mechanism, wherein the towed vehicle receiver mechanism is structured and configured to operatively and wirelessly receive the second modulated digital signals transmitted by the towing vehicle transmitter mechanism.

14. An interactive system for remotely controlling the braking system of a towed vehicle, comprising:

(a) a towing vehicle subsystem positioned in a towing vehicle and including:
(1) a towing vehicle control mechanism including a monitoring mechanism with a display device,
(2) a towing vehicle transmitter mechanism having first circuitry connected in communication with the towing vehicle transmitter mechanism that is structured and configured to operatively and wirelessly transmit towing vehicle encoded digital signals,
(3) a towing vehicle receiver mechanism having second circuitry connected in communication with the towing vehicle control mechanism that is structured and configured to operatively and wirelessly receive and decode towed vehicle encoded digital signals, and
(4) a towed vehicle multi-position DIP switch, wherein the towed vehicle DIP switch is structured and configured to provide encoding to the modulated digital signals transmitted by the towed vehicle transmitter mechanism;

(b) a towed vehicle subsystem positioned in a towed vehicle and including:
(1) a towed vehicle control mechanism,
(2) a towed vehicle receiver mechanism having third circuitry connected in communication with the towed vehicle control mechanism that is structured and configured to operatively and wirelessly receive and decode the towing vehicle encoded digital signals,
(3) a linkage mechanism connecting the towed vehicle control mechanism to the braking system of the towed vehicle,
(4) sensing mechanism connected in communication with the towed vehicle control mechanism, the sensing mechanism having sensors positioned to operatively sense activation of the braking system of the towed vehicle,
(5) a towed vehicle transmitter mechanism including fourth circuitry and connected to the towed vehicle control mechanism that is structured and configured to operatively and wirelessly transmit towed vehicle encoded digital signals, and
(6) a towing vehicle multi-position DIP switch, wherein the towing vehicle DIP switch is structured and configured to decode the modulated digital signals received by the towing vehicle receiver mechanism from the towed vehicle transmitter mechanism; and (c) at least one power source supplying electrical power to the towing vehicle subsystem and the towed vehicle subsystem; and (d) wherein activation of the towing vehicle control mechanism by an operator of the towing vehicle actuates the towed vehicle control mechanism by:
  (1) causing the towing vehicle transmitter mechanism to transmit towing vehicle encoded wireless digital signals to the towed vehicle receiver mechanism,
  (2) activating the towed vehicle control mechanism to cause:
    (A) the linkage mechanism to actuate the braking system of the towed vehicle, and
    (B) the sensing mechanism, upon sensing the activation of the braking system of the towed vehicle, to cause the towed vehicle transmitter mechanism to transmit second encoded wireless digital signals to the towing vehicle receiver mechanism which, in conjunction with the towing vehicle control mechanism, causes the display device to indicate that the braking system of the towed vehicle has been actuated.

* * * * *